Figure 1:
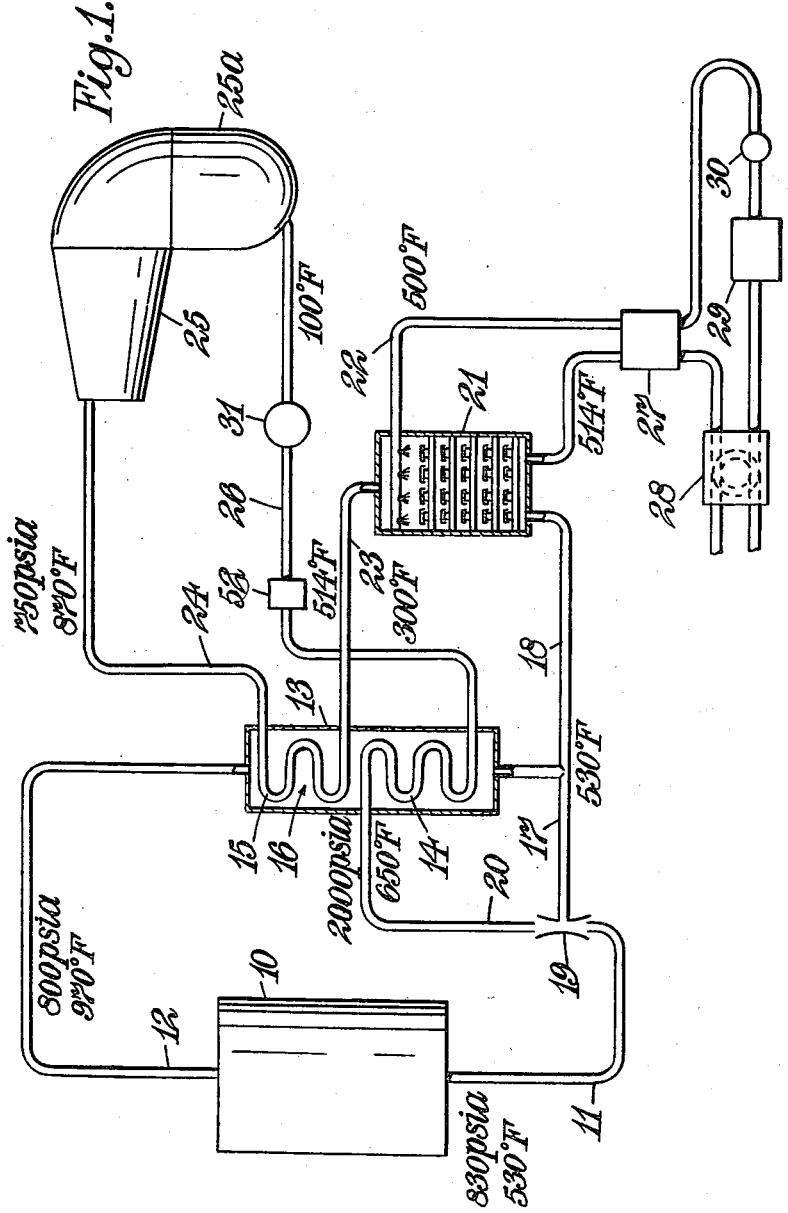

United States Patent Office 3,117,422
Patented Jan. 14, 1964

3,117,422
STEAM-OPERATED POWER PLANT INCLUDING NUCLEAR REACTOR
Stefan George Bauer and Martin Heness Kendon, Derbyshire, England, assignors to Rolls-Royce Limited, Derby, England, a British company
Filed Jan. 5, 1961, Ser. No. 80,836
Claims priority, application Great Britain Jan. 11, 1960
11 Claims. (Cl. 60—104)

This invention comprises improvements in or relating to stem-operated power plant of the class employing a nuclear reactor as a heat source and comprising a steam turbine.

According to the present invention, a steam-operated power plant of the class referred to comprises a steam circuit in which steam leaving the nuclear reactor passes through one flowpath of a primary heat exchanger and then part at least of this steam is passed through contact washing equipment before being reheated by flowing through a second flow path of the primary heat exchanger and being led to the turbine to operate it.

In this way, steam from the reactor my be used in the turbine so avoiding the use of primary and secondary steam generating circuits, and also the radioactivity of the steam entering the turbine is greatly reduced as compared with its radioactivity on leaving the reactor.

According to a preferred feature of this invention, the reactor is steam cooled and condensate from the turbine is converted to steam by heat exchange with steam leaving the reactor, the resulting steam being led to the reactor to cool it. In one arrangement, the condensate is fed to a third flow path of the primary heat exchanger to be converted to steam, and, in another arrangement, the condensate is fed to a further heat exchanger through which steam from the reactor is fed to vaporise the condensate; in the second arrangement the primary and further heat exchangers are conveniently fed with steam from the reactor through separate branch conduits.

According to one preferred arrangement of this invention, the steam produced from the condensate is employed to operate a thermo-pump device which has a connection from its suction side to the outlet end of the first flow path of the primary heat exchanger so that part of the steam from the first flow path is re-circulated through the reactor without passing through the contact washing equipment or the turbine.

According to another preferred arrangement, the steam produced from the condensate is employed to operate a thermo-pump device which has a connection from its suction side to receive steam which has been used for heating purposes in the further heat-exchanger.

The water employed in the contact washing equipment is preferably circulated through a decontaminating system comprising a regenerative heat exchanger, a cooler, ion-exchange and degassing plant before being pumped back through the regenerative heat exchanger to the contact washing equipment.

Figure 2:
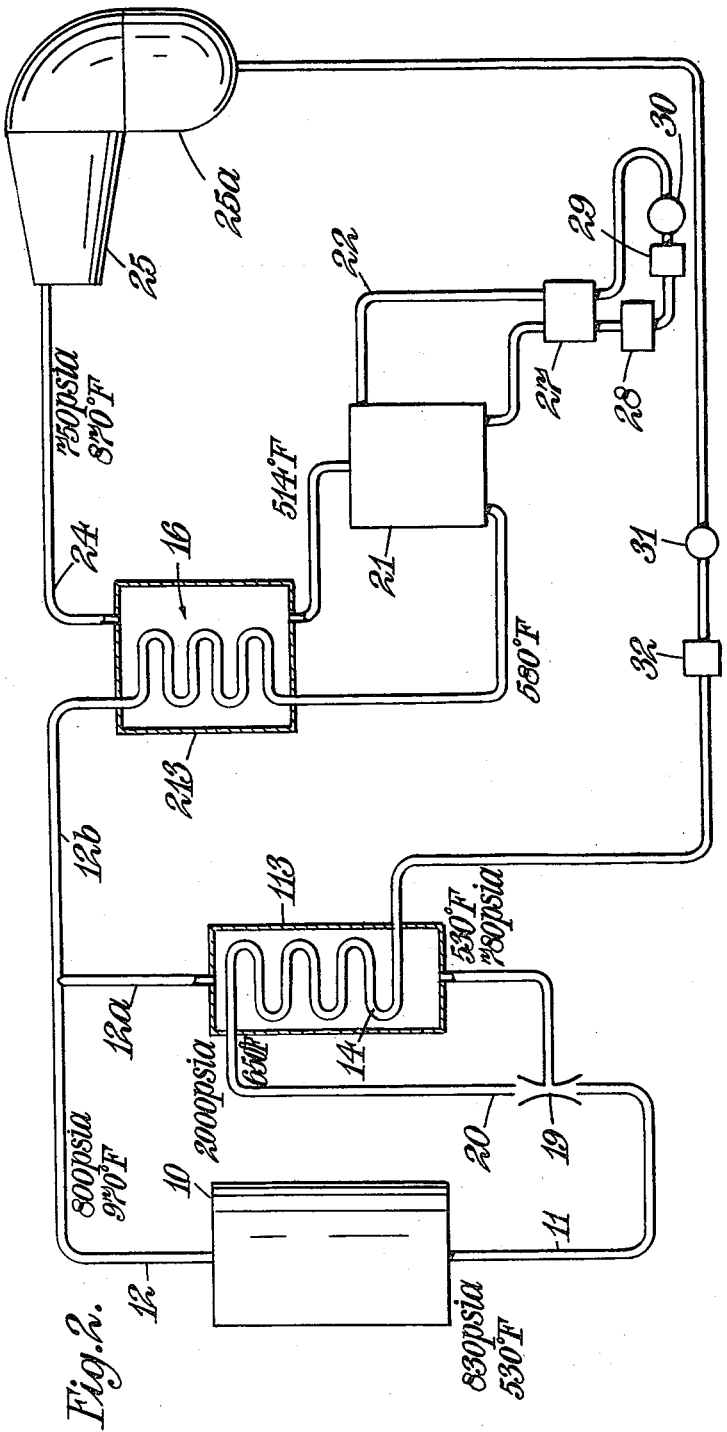

Two forms of steam operated power plant of this invention are illustrated in the accompanying diagrammatic drawings in which:

FIGURE 1 shows one form, and
FIGURE 2 illustrates a modification.

The plant illustrated in FIGURE 1 comprises a steam-cooled reactor 10 having a steam inlet conduit 11 and a super-heated steam outlet conduit 12 which leads to the inlet end of a first flow path 16 of a primary heat exchanger 13. The heat-exchanger 13 houses two steam coils 14, 15 and fluid flowing in these coils is heated by the steam flowing in the path 16.

The outlet end of the flow path 16, where the steam is close to saturation temperature, is connected to two conduits 17, 18 so that the steam is divided into two streams. The conduit 17 leads to the suction inlet of a thermo-compressor pump 19 which is fed by conduit 20 with superheated steam from the steam coil 14, and the outlet of the pump 19 is connected to conduit 11.

Conduit 18 conveys part of the steam from the flow path 16 to contact washing equipment 21 through which the steam passes in counterflow relationship with water sprayed into the washing equipment 21 from pipe 22. The water is at substantially the same pressure and temperature as the steam and in the equipment 21 the solubility relationships are such that radioactivity is transferred from the steam to the washing water by effective contact between the steam and the water. A decontamination factor of between 1,000 and 10,000 may be obtained by the single washing stage, but if desired more than one such stage may be employed to obtain higher decontamination factors.

The decontaminated steam is conveyed from the contact washing equipment 21 by conduit 23 to the steam coil 15 of the primary heat exchanger 13 to be superheated before being conveyed by conduit 24 to the entry of a turbine 25 where the steam is substantially at the reactor operating pressure and slightly lower in temperature. The exhaust steam from the turbine 25 is condensed in condenser 25a and the condensate is conveyed in conduit 26 through a feed pump 31 and feed water heater 32 to the inlet side of the coil 14 to be turned into steam and preheated prior to return through the thermo-compressor pump 19 to the reactor 10.

The contact washing equipment 21 may be of any known or convenient kind suitable for variable throughput; for instance it may be of the bubble cap type as illustrated, or of the crossed grid cooling tower type, or of the "Spraypack" type.

The washing water for use in the contact washing equipment is circulated in a decontaminating system comprising a regenerative heat exchanger 27, a cooler 28, ion exchange and degassing plant 29 and a pump 30 which delivers the treated water back through the regenerative heat-exchanger 27 to the spray-pipe 22.

In FIGURE 2, a modified form of plant is illustrated in which the steam leaving the reactor through conduit 12 is divided into two streams lead by branch conduits 12a, 12b respectively to a heat exchanger 113 containing the coil 14 for evaporating turbine condensate and superheating the resulting steam, and to a primary regenerative heat exchanger 213 wherein washed steam is re-heated by the steam flowing to the washing equipment 21. The steam leaving the heat exchanger 113 is fed back to the reactor by the thermo-compressor pump 19, and the whole of the steam from the regenerative heat exchanger 213 flows to the washing equipment 21.

Temperatures and pressures at various points in the plants are shown on the drawings.

The power plants above described have the economic and operating advantages of the class of plant in which the steam from the reactor is used in the turbine rather than as a source of heat for heating turbine steam flowing in a separate secondary circuit, and at the same time avoid substantial difficulties which would arise due to passing high radioactive steam through the turbine, so reducing or obviating the need for shielding of the turbine and simplifying maintenance.

We claim:
1. A steam-operated power plant comprising
    (a) a nuclear reactor as a heat source,
    (b) driving means delivering coolant to said nuclear reactor, the coolant leaving the reactor as steam,
    (c) a primary heat exchanger having

($c_1$) means defining a first flow path therein
($c_2$) and means defining a second flow path therein, steam flowing from said nuclear reactor being passed along said first flow path,
(d) contact washing equipment connected to receive steam flowing from said first flow path and including means delivering washing water, said contact washing equipment delivering washed steam to said means defining said second flow path whereby steam flowing in said second flow path is reheated by steam flowing in said first flow path, and
(e) a steam turbine connected to receive steam flowing from said second flow path.

2. A steam-operated power plant according to claim 1, comprising a steam condenser connected to receive steam from said turbine and to condense said steam to water, said driving means delivering coolant to the nuclear reactor including heat exchange steam generating means receiving the water from said condenser and receiving steam from said nuclear reactor and generating steam from said water by heat exchange between the water and the steam from the nuclear reactor, said heat exchange steam generating means delivering the steam so generated to the nuclear reactor to cool it.

3. A steam-operated power plant according to claim 2, said heat exchange steam generating means being combined in said primary heat exchanger and defining a third fluid flow path therein, the third fluid flow path receiving water from the condenser and being in heat exchange with steam flowing in said first fluid flow path.

4. A steam-operated power plant according to claim 2, comprising a thermo-pump device connected to be operated by steam generated in said heat exchange steam generating means and to deliver to said nuclear reactor, said thermo-pump device also having a suction inlet connected to the outlet end of said means defining said first flow path.

5. A steam-operated power plant according to claim 2, said heat exchange steam generating means comprising a further heat exchanger separate from said primary heat exchanger, said further heat exchanger having therein means defining fluid flow paths respectively for the water and for steam from the reactor.

6. A steam-operated power plant according to claim 5, comprising an outlet connection leading steam from the nuclear reactor, a first branch pipe leading from said outlet connection to said primary heat exchanger reactor, and a second branch pipe leading from said outlet connection to the further heat exchanger.

7. A steam-operated power plant according to claim 5, comprising a thermo-pump device connected to be operated by steam generated in said further heat exchanger and to deliver to the nuclear reactor, said thermo-pump device also having a suction inlet connected to receive steam which has passed through the flow path of the further heat exchanger in which steam from the reactor flows.

8. A steam-operated power plant according to claim 1, comprising a water circulating circuit connected to deliver water to and receive water from the contact washing equipment, said circuit comprising a regenerative heat exchanger having means defining a first path receiving water from the washing equipment and means defining a second path delivering water to the washing equipment, and a water cooler, ion exchange and degassing means and a pump connected in flow series between the outlet end of said first path of the regenerative heat exchanger and the inlet end of said second path of the regenerative heat exchanger.

9. A steam operated power plant comprising
(a) a nuclear reactor as a heat source,
(b) a thermo-pump device delivering coolant to said nuclear reactor, the coolant leaving the reactor as steam,
(c) a primary heat exchanger having
($c_1$) means defining first and
($c_2$) means defining second flow paths therein, steam flowing from said nuclear reactor, being passed through said first flow path,
(d) contact washing equipment connected to receive steam flowing from said first flow path and including means delivering washing water, said contact washing equipment delivering washed steam to said means defining said second flow path, whereby steam flowing in said second flow path is reheated by steam flowing in said first flow path, and
(e) a steam turbine connected to receive steam flowing from said second flow path.

10. A steam operating power plant according to claim 9 further comprising a steam condenser connected to receive steam from said turbine and to condense said steam to water and heat exchange steam generating means receiving the water from said condenser and receiving steam from said nuclear reactor, generating steam from said water by heat exchange between the water and the steam from the nuclear reactor, and delivering the steam so generated to said thermo-pump device.

11. A steam operated power plant according to claim 10, said heat exchange steam generating means being combined in said primary heat exchanger and defining a third fluid flow path therein, the third fluid flow path receiving water from the condenser and being in heat exchange with steam flowing in said first fluid flow path.

References Cited in the file of this patent

UNITED STATES PATENTS

| | | |
|---|---|---|
| 2,865,827 | Dwyer | Dec. 23, 1958 |
| 3,047,479 | Young et al. | July 31, 1962 |

FOREIGN PATENTS

| | | |
|---|---|---|
| 641,440 | Germany | Feb. 1, 1937 |

OTHER REFERENCES

Proceedings of the Second United Nations International Conference on the Peaceful Uses of Atomic Energy, volume 8, Geneva, 1958, pp. 398–402, 405–413. Copy in Division 46.

Volume 9 of above publication, page 227.